US008270786B2

(12) United States Patent
Westbrook

(10) Patent No.: US 8,270,786 B2
(45) Date of Patent: Sep. 18, 2012

(54) OPTICAL FIBER MODE COUPLERS

(75) Inventor: Paul S. Westbrook, Bridgewater, NJ (US)

(73) Assignee: OFS Fitel, LLC, Norcross, GA (US)

(*) Notice: Subject to any disclaimer, the term of this patent is extended or adjusted under 35 U.S.C. 154(b) by 488 days.

(21) Appl. No.: 12/313,580

(22) Filed: Nov. 21, 2008

(65) Prior Publication Data
US 2010/0129029 A1 May 27, 2010

(51) Int. Cl.
G02B 6/34 (2006.01)
(52) U.S. Cl. .......................... 385/28; 385/37
(58) Field of Classification Search .................. None
See application file for complete search history.

(56) References Cited

U.S. PATENT DOCUMENTS

| 5,802,234 | A * | 9/1998 | Vengsarkar et al. | 385/123 |
| 5,966,481 | A * | 10/1999 | Jolley et al. | 385/28 |
| 6,411,755 | B1 * | 6/2002 | Erdogan | 385/28 |
| 7,228,029 | B1 * | 6/2007 | Ramachandran et al. | 385/28 |
| 2003/0002794 | A1 * | 1/2003 | Ramachandran | 385/37 |
| 2003/0202761 | A1 * | 10/2003 | Ruilier et al. | 385/123 |
| 2004/0036955 | A1 * | 2/2004 | Digonnet et al. | 359/341.1 |
| 2004/0047551 | A1 * | 3/2004 | Ramachandran | 385/28 |
| 2005/0220403 | A1 * | 10/2005 | Dykaar | 385/31 |
| 2006/0103919 | A1 * | 5/2006 | DiGiovanni et al. | 359/341.5 |
| 2006/0239610 | A1 * | 10/2006 | Hickey et al. | 385/28 |
| 2009/0080470 | A1 * | 3/2009 | Ramachandran et al. | 372/6 |
| 2010/0061410 | A1 * | 3/2010 | Platonov et al. | 372/21 |

OTHER PUBLICATIONS

M. Sumetsky et al. Multiple mode conversion and beam shaping with superimposed long period gratings. Optics Express, 16:1:402-412, Jan. 2008.*

* cited by examiner

Primary Examiner — Mike Stahl
(74) Attorney, Agent, or Firm — Law Office of Peter V.D. Wilde

(57) ABSTRACT

Described are optical devices and related methods wherein a multiple mode input in a Higher Order Mode (an HOM) optical fiber is converted by a complex mode transformer to produce a fundamental mode output in an optical medium with an E-field that is substantially different than that exiting the HOM optical fiber. The medium is preferably a Large Mode Area (LMA) optical fiber, or free space. The mode transformer may be a series of refractive index perturbations created either by photo-induced gratings or by gratings formed by physical deformations of the optical fiber.

9 Claims, 8 Drawing Sheets

OPTICAL FIBER MODE COUPLERS

RELATED APPLICATION

This application is related to application Ser. No. 12/157,214, filed Jun. 9, 2008, which application is incorporated herein by reference.

FIELD OF THE INVENTION

The invention relates to optical fiber mode controlling devices.

BACKGROUND OF THE INVENTION

Optical fiber and optical waveguide mode converters are well known and come in a variety of forms. They operate typically by transforming an input mode, usually a fundamental mode, into a higher order mode, or vice versa. An especially attractive mode converter device comprises a long period grating (LPG) formed in an optical fiber. See for example, U.S. Pat. No. 6,768,835, and T. Erdogan, "Fiber grating spectra," J. Lightwave Technology vol. 15, p. 1277 (1997).

These mode converters operate with a single mode input, and typically a single mode output. Propagating light in more than one mode at a time, and controllably changing the mode of more than one mode at a time, would be an attractive goal, but to date not widely achieved.

The function of effective and controlled mode conversion is useful in devices that process optical signals in higher order modes (HOMs). See, for example, U.S. Pat. No. 6,768,835, issued to Siddharth Ramachandran on Jul. 24, 2004, and incorporated by reference herein. A problem in some devices of this kind is that the radial dependence of the E-fields of the HOMs in the HOM optical fiber is complicated and not very useful for applications that require specific E-field distributions. For instance, it may be desirable to deliver extremely high power laser energy through air-core photonic bandgap optical fibers (ACPBGs) or large mode area optical fibers (LMAs) as near Gaussian modes. However, such modes may have a very different E-field profile than the E-field profile within the HOM optical fiber. In another example, tight focusing of the output of the HOM optical fiber may be required. The desired beam shape for focusing is typically a Gaussian free-space mode. The beam shape exiting the HOM optical fiber is typically far from Gaussian.

$$dA_1/dz = i\sigma A_1 + i\kappa A_1 \qquad \text{Equation (5)}$$

SUMMARY OF THE INVENTION

I have designed optical devices and related methods wherein a multiple mode input in a Higher Order Mode (an HOM) optical fiber is converted by a complex mode transformer to produce a fundamental mode output in an optical medium with an E-field that is substantially different than that exiting the HOM optical fiber. The medium is preferably a Large Mode Area (LMA) optical fiber, or free space. The mode transformer may be a series of refractive index perturbations created either by photo-induced gratings or by gratings formed by physical deformations of the optical fiber.

DETAILED DESCRIPTION

Figure 1:
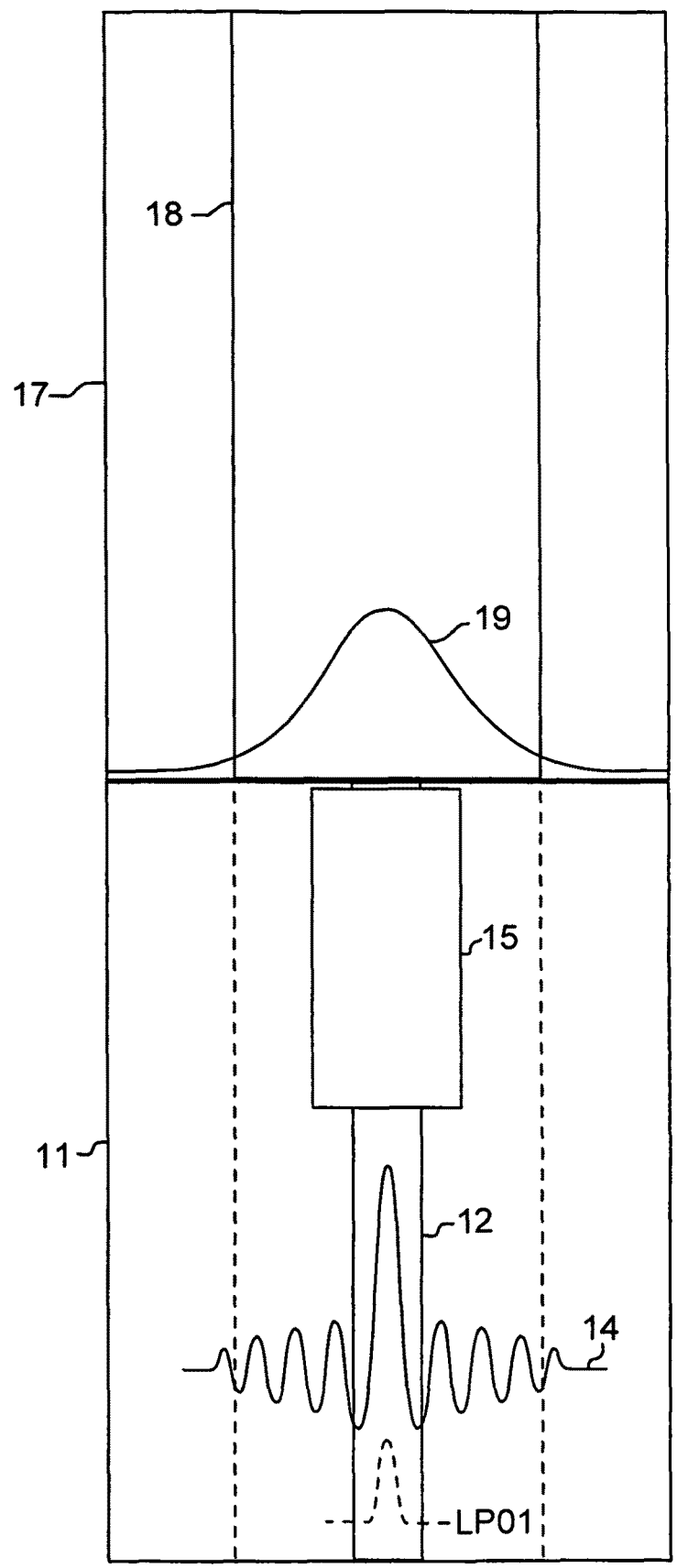
FIG. 1 is an illustration of a combination HOM and mode transformer coupled to a large mode area (LMA) optical fiber.

FIG. 1 is an illustration of a combination HOM optical fiber and mode transformer, coupled to a large mode area (LMA) optical fiber. The HOM optical fiber is sometimes referred to as a few mode optical fiber. The HOM optical fiber is shown at 11, with schematic HOM waveform 14 illustrating the light propagating in the core 12 of the optical fiber. A fundamental mode (LP01) is shown in phantom for comparison.

The light signal 14, or another waveform (not shown) processed to produce waveform 14, may be processed in the core of the HOM optical fiber 11. The processing may be amplification, filtering, engineered chromatic dispersion, etc. An example of processing HOMs in few mode fibers is described in U.S. Pat. No. 6,768,835, referenced above.

Referring again to FIG. 1, the light signal 14 is then converted by mode converter 15. The output 19 of the mode converter is coupled to an LMA optical fiber 17. The core of the LMA fiber is shown at 18 and, as seen, is much larger than the core 12 of the HOM optical fiber. The mode converter 15 desirably converts the waveform 14 to a waveform 19 that more closely matches the E-field of the LMA optical fiber.

Similar considerations apply to the case where the receiving optical fiber is an ACPBG in place of the LMA optical fiber. The LMA embodiment is preferred but substituting an ACPBG is a useful alternative.

Figure 2:
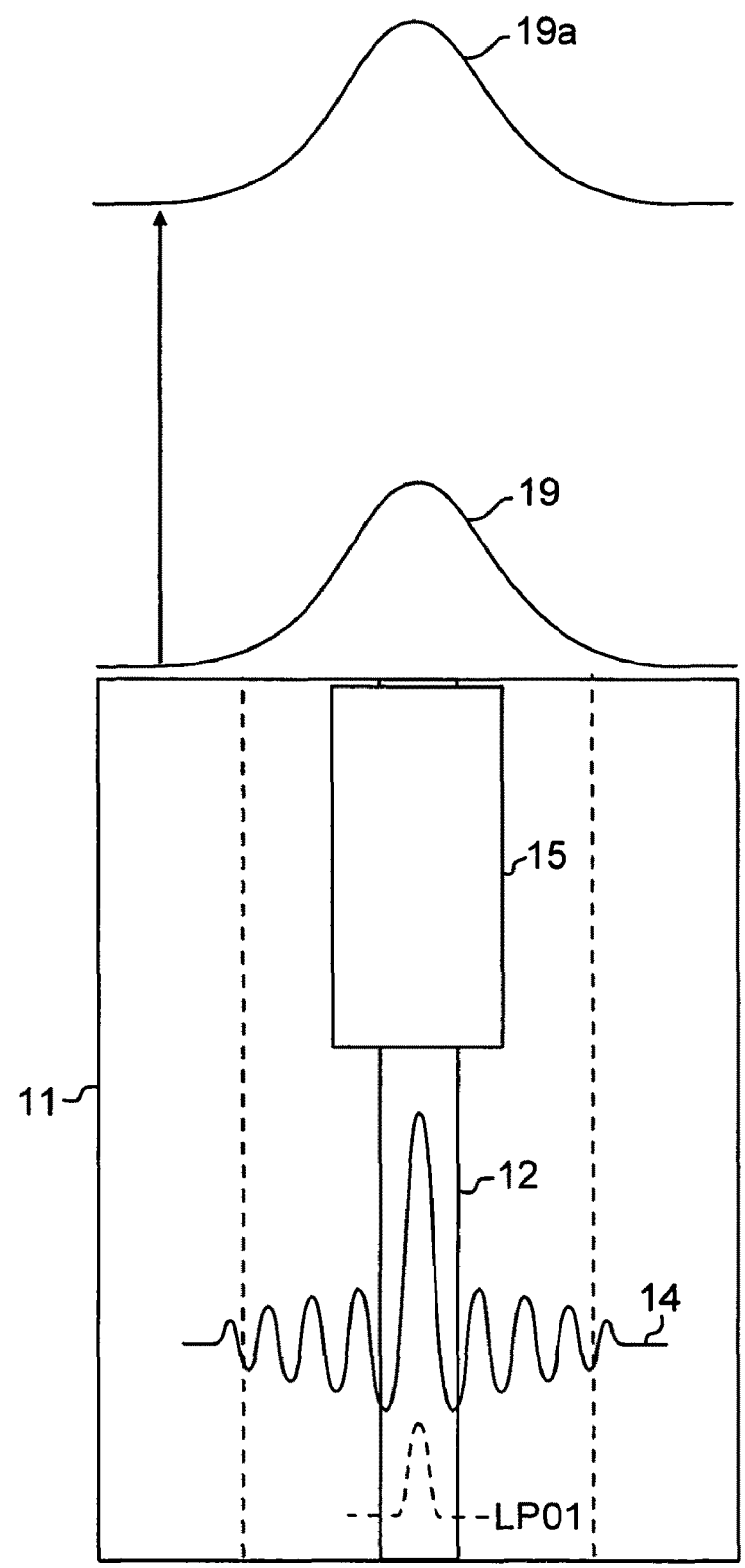
FIG. 2 is an illustration similar to that of FIG. 1 of a combination HOM and mode transformer coupled to free space.

FIG. 2 shows a similar arrangement for propagating a near Gaussian waveform 19, 19a, in free space. This beam shape is desirable for delivering the light energy to a remote location, for example, delivering high power laser output to a specific location or spot through an optical fiber pigtail. It is also desirable for focusing the beam 19 in free space.

Figure 3:
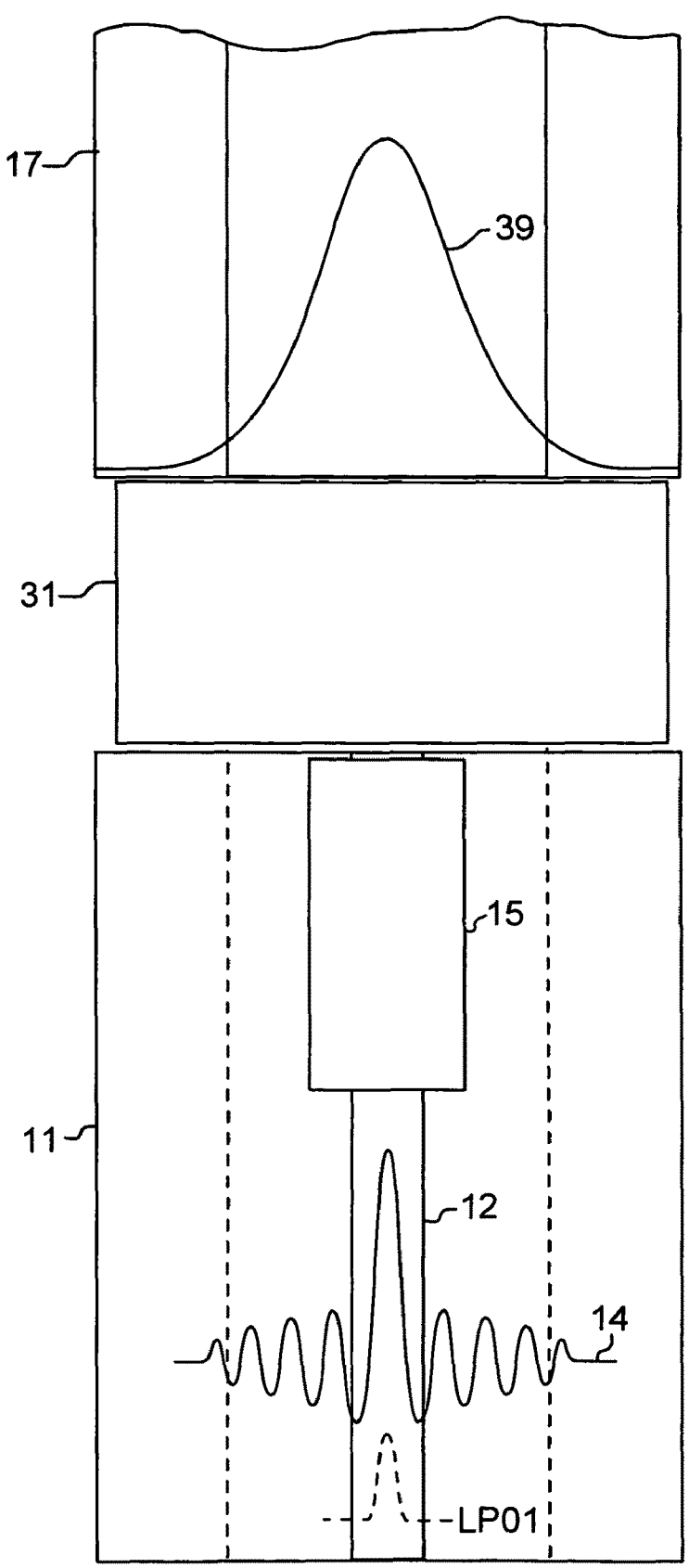
FIG. 3 shows the combination of FIG. 2 with a focusing element.

FIG. 3 shows the combination of HOM optical fiber 11 and mode converter 15, as in FIG. 1, attached to a focusing element 31, in this illustration a GRIN lens. The focusing element may be a useful accessory for shaping the output of the mode converter 15 to a desired shape 39.

Design of the mode converter shown at 15 in FIGS. 1-3 is described as follows.

The simplest case of coupling between several copropagating modes is coupling between two modes. Conversion between two modes can be performed with a long period grating (LPG), which periodically changes the effective refractive index of the fiber according to the following equation:

$$n_{eff}(z) = n_0 + \Delta n \cos\left(\frac{2\pi}{\Lambda}z + \theta\right) \quad (1)$$

where $\Lambda$ is the period of the LPG. Assume that the LPG starts at z=0 and ends at z=L (see FIG. 1). Consider modes 1 and 2 having the propagation constants $\beta_1$ and $\beta_2$, respectively. For determinacy, assume that $\beta_2 > \beta_1$. In the absence of LPG, at z<0, modes 1 and 2 have the form:

$$E_1(x,y,z) = C_{10}\exp(i\beta_1 z + i\phi_1)e_1(x,y)$$

$$E_2(x,y,z) = C_{20}\exp(i\beta_2 z + i\phi_2)e_2(x,y)' \quad (2)$$

Here z is the coordinate along the fiber, x, y are the transverse coordinates, $e_j(x,y)$ are the real-valued transverse mode distribution, and $C_{j0}$ and $\phi_j$ are constants, which determine the amplitudes and the phases of modes, respectively. When these modes enter the section of the fiber containing the LPG, the coordinate dependence can be written in the form:

$$E_1(x,y,z) = A_1(z)\exp\left\{i\left[\beta_1 - \delta + \frac{1}{2}(\sigma_{11}+\sigma_{22})\right]z + \frac{i}{2}\theta\right\}e_1(x,y) \quad (3)$$

$$E_2(x,y,z) = A_2(z)\exp\left\{i\left[\beta_2 + \delta + \frac{1}{2}(\sigma_{11}+\sigma_{22})\right]z - \frac{i}{2}\theta\right\}e_2(x,y),$$

where $$\delta = \frac{1}{2}(\beta_1 - \beta_2) + \frac{\pi}{\Lambda}, \quad (4)$$

$\sigma_{jj}$ are the "dc" coupling coefficients [see e.g. T. Erdogan, "Fiber grating spectra," J. Lightwave Technology vol. 15, p. 1277 (1997)], and $A_j(z)$ are the functions, which are determined by the coupling wave equations:

$$\frac{dA_1}{dz} = i\sigma A_1 + i\kappa A_2 \quad (5)$$

$$\frac{dA_2}{dz} = i\kappa A_2 - i\sigma A_2$$

Here $\sigma$ is the general "dc" self-coupling coefficient and $\kappa$ is the "ac" cross-coupling coefficient. Comparing Eq. (2) and Eq. (3), the initial conditions for $A_j(z)$ are:

$$A_1(0) = C_{10}\exp\left[i\left(\varphi_1 - \frac{\theta}{2}\right)\right] \quad (6)$$

$$A_2(0) = C_{20}\exp\left[i\left(\varphi_2 + \frac{\theta}{2}\right)\right]$$

Solution of Eq. (5) is:

$$A_1(z) = \left(\cos(\mu z) + i\frac{\sigma}{\mu}\sin(\mu z)\right)A_1(0) + i\frac{\kappa}{\mu}\sin(\mu z)A_2(0) \quad (7)$$

$$A_2(z) = i\frac{\kappa}{\mu}\sin(\mu z)A_1(0) + \left(\cos(\mu z) - i\frac{\sigma}{\mu}\sin(\mu z)\right)A_2(0)$$

where $\mu = \sqrt{\sigma^2 + \kappa^2}$. The power of the mode j is determined as:

$$P_j(z) = \int dx dy E_j(x,y,z)E^*_j(x,y,z) = |A_j(z)|^2 \quad (8)$$

Here it is assumed that the transverse components of the modes are normalized:

$$\int dx dy e_j(x,y)e^*_j(x,y) = 1 \quad (9)$$

It is possible to find the LPG parameters $\theta$, $\sigma$, $\kappa$, and L, so that, for arbitrary $C_{j0}$ and $\phi_j$, the requested $A_j(L)$ at z=L can be obtained, which satisfy the energy conservation rule:

$$P_1(L) + P_2(L) = P_1(0) + P_2(0) \quad (10)$$

where $$P_j(0) = |A_j(0)|^2, \quad P_j(L) = |A_j(L)|^2 \quad (11)$$

The corresponding equations for $\sigma$, $\kappa$, and L are found from Eq. (7):

$$\cos(\mu L) = \text{Re}X \quad (12)$$

$$\frac{\kappa}{\mu} = -\frac{iY}{\sqrt{1-(\text{Re}X)^2}} \quad (13)$$

where $$X = \frac{A^*_1(0)A_1(L) + A_2(0)A^*_2(L)}{|A_1(0)|^2 + |A_2(0)|^2} \quad (14)$$

$$Y = \frac{A^*_2(0)A_1(L) - A_1(0)A^*_2(L)}{|A_1(0)|^2 + |A_2(0)|^2}. \quad (15)$$

Eq. (13) is self-consistent only if the right hand side is real. From Eq. (15), the later condition is satisfied if $$Re(A^*_2(0)A_1(L)) = Re(A_1(0)A^*_2(L)). \quad (16)$$

Eq. (16) can be satisfied with appropriate choice of the LPG phase shift, $\theta$. Thus, the input modes 1 and 2, with arbitrary amplitudes and phases, can be converted into any other modes, with arbitrary amplitudes and phases, if the condition of the energy conservation, Eq. (10), is fulfilled.

In some applications, it may be necessary to convert two modes with known input powers, $P_1(0)$ and $P_2(0)$ into two modes with the requested power ratio $P_2(L)/P_1(L)$ and with no restrictions on the phases of $A_1(L)$ and $A_2(L)$. This conversion can be performed with the simplified LPG, which satisfies the phase matching condition, $\sigma=0$. For example, assume the condition that after passing the coupling region of length L, the light is completely transferred to mode 1 and mode 2 is empty:

$$P_1(L) = P_1(0) + P_2(0), \quad P_2(L) = 0, \quad P_j(L) = |A_j(L)|^2 \quad (17)$$

This condition can be satisfied independently of the initial phases of $A_1(0)$ and $A_2(0)$ only if one of the initial powers is zero. For example, if $P_1(0)=0$ then Eq. (4) is satisfied if $$\cos(\kappa L) = 0 \quad (18)$$

This result is used in mode conversion based on long period fiber gratings. However, if both of initial powers $P_1(0)$ and $P_2(0)$ are not zeros, Eq. (17) can be satisfied when the initial phase difference between modes 1 and 2 is $$\arg(A_1(0)/A_2(0)) = \pm\frac{\pi}{2} \quad (19)$$

Then the condition of full conversion of modes 1 and 2 into mode 1 is:

$$\tan(\kappa L) = \frac{iA_2(0)}{A_1(0)} \quad (20)$$

The right hand side of this equation is real due to Eq. (19). Thus, in order to perform essentially full conversion of light, which is arbitrarily distributed between two modes, the initial phases of these modes should be adjusted and the coupling coefficient κ and coupling length L should be chosen from Eq. (20). Furthermore, if the phase condition of Eq. (19) is satisfied then it can be shown that the powers of modes can be arbitrarily redistributed with the appropriate choice of coupling parameters. In fact, assume that the ratio of the input mode powers is $R_0 = P_1(0)/P_2(0)$. Then in order to arrive at the output mode ratio $R_L = P_1(L)/P_2(L)$, the coupling coefficient κ may be defined from the equation:

$$\tan(\kappa L) = \mp \frac{R_0^{1/2} + R_L^{1/2}}{1 - (R_0 R_L)^{1/2}}, \quad (21)$$

where the signs ∓ correspond to ± in Eq. (19). Eq. (20) is derived from Eq. (7) for σ=0. For the condition of full mode conversion, $R_L = \infty$, Eq. (21) coincides with Eq. (18). Practically, Eq. (21) can be satisfied by choosing the appropriate LPG strength and length. Eq. (19) can be satisfied by changing the length of the fiber in front of LPG by heating, straining, or with other type of refractive index perturbation or deformation. Such perturbations and deformations are described in U.S. Pat. No. 6,768,835, which is incorporated herein by reference. This condition can be also satisfied by inscribing the LPG at the proper place along the fiber length.

This basic teaching can be extended to the more general case wherein light propagating along M modes with amplitudes $A_1^0, \ldots, A_M^0$ is converted to the same or other N modes with amplitudes $A_1^f, \ldots, A_M^f$. This can be done by a series of two or more mode couplers described above and illustrated in FIG. 4. Due to energy conservation:

$$P_1^0 + \ldots + P_M^0 = P_1^f + \ldots + P_N^f, P_j^{0,f} = |A_j^{0,f}|^2. \quad (22)$$

Figure 4:
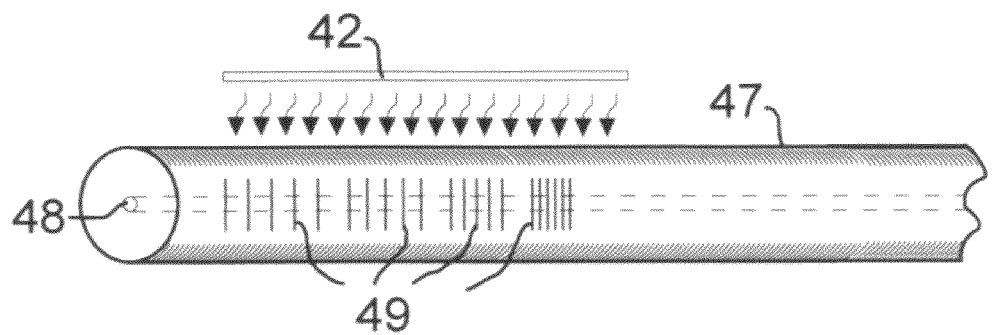
FIG. 4 is a schematic representation of a mode transformer using serially arranged multiple LPG mode transformers.

Without loss of generality, assume M=N, which can be always done by adding empty modes. If $P_1^0$ is the largest power among the initial partial powers and $P_1^f$ is the smallest power among the final partial powers then, according to Eq. (22), we have $P_1^0 \geq P_1^f$. The first two-mode transformation fills mode 1 with the desired power: $P_1^0 + P_2^0 \rightarrow P_1^f + P_2'$ where $P_2' = P_1^0 + P_2^0 - P_1^f$. In the result of this transformation, the problem of conversion is reduced to the case of N−1 modes, which can be solved similarly. Thus, with reference to FIG. 4, any power redistribution between two sets of N modes can be performed with a series 49 of N−1 two-mode transformations as shown in the figure. In the device of FIG. 4 the mode transformers are complex LPGs formed in the core 48 of optical fiber 47, and arranged serially along the length of the fiber.

Figure 5:
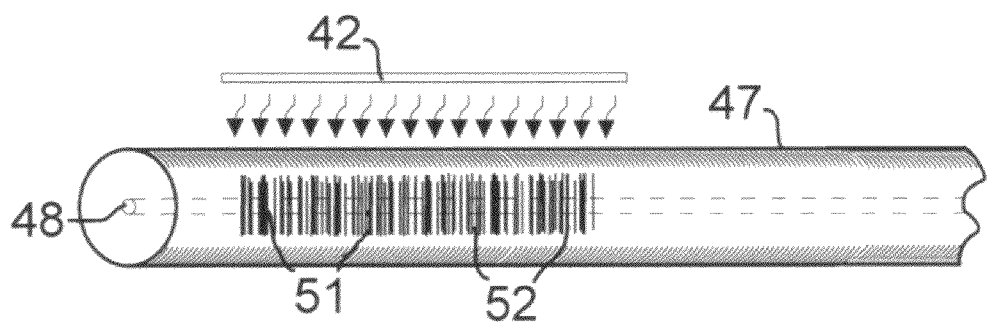
FIG. 5 is an illustration similar to that of FIG. 4 showing a mode transformer with superimposed multiple LPG transformers.

Alternatively, essentially the same result can be achieved using an LPG where the individual gratings 49 in FIG. 4 are superimposed on one another. This complex LPG is shown in FIG. 5 where grating 52 is superimposed on grating 51. Only two gratings are shown for clarity. Also for clarity, grating 52 is shown slightly larger than grating 51. The complex LPG simultaneously performs coupling and transformations between several modes. The LPGs may be chosen to perform coupling between mode 1 and all other modes, while the intermode coupling between modes, which have numbers greater than one, is zero. The coupling wave equations, which describe the considered system are:

$$\frac{dA_1}{dz} = i(\kappa_{12}A_2 + \kappa_{13}A_{13} + \ldots + \kappa_{1N}A_N) \quad (23)$$
$$\frac{dA_2}{dz} = i\kappa_{12}A_1$$
$$\ldots$$
$$\frac{dA_N}{dz} = i\kappa_{1N}A_1$$

These equations are the generalization of the coupling mode equations, Eq. (5). The initial power distribution is:

$$P_1^0 = |A_1(0)|^2, P_2^0 = |A_1(0)|^2, \ldots, P_N^0 = |A_N(0)|^2 \quad (24)$$

Solution of Eq. (23) with these boundary conditions leads to the following condition of conversion of all modes into the single mode 1:

$$\tan\left(L\sqrt{\sum_{n=2}^{N}\kappa_{1N}^2}\right) = \frac{i}{A_1(0)}\sqrt{\sum_{n=2}^{N}[A_n(0)]^2}, \quad (25)$$

which can be satisfied only under the condition of the phase shifts:

$$\arg(A_1(0)/A_n(0)) = \pm\frac{\pi}{2}, n = 2, 3, \ldots, N, \quad (26)$$

Eq. (26) means that the difference between phases of all modes except mode 1 should be equal to zero or π, while the difference between the phase of mode 1 and the phases of other modes should be ±π/2. For the particular case of N=2, Eqs. (25) and (26) coincide with Eq. (20) and (19), respectively. Results show that, using LPG mode transformers, it is possible to convert the arbitrary distributed modes into a single mode if the phases of modes are appropriately tuned. The phases of LPGs can be tuned by shifting the positions of individual LPGs with respect to each other by, for example, using mechanisms described earlier.

Referring again to FIGS. 4 and 5, the LPGs extend into the cladding as shown. This may be useful if the gratings are to effectively transform higher order modes propagating outside the core. The output of the mode converter section is not shown, but is evident in FIGS. 1-3.

It should be understood that the drawing is not to scale. For example, the gain section 47 is typically much longer.

The LPG mode transformers in FIG. 5 may be superimposed completely or partially. In fabricating devices with superimposed gratings the superimposed grating pattern may be formed in discrete steps by forming one grating then superimposing a second, third, etc. gratings on the first, second, etc. grating. Alternatively, the superimposed grating elements may be formed serially in a point to point manner, or may be formed in a single step using a mask pattern comprising superimposed gratings. As stated earlier, for any of these cases where multiple LPGs are used, either arranged serially or superimposed, the LPG may be referred to as a complex LPG. A complex LPG is defined as a grating having more than one simple LPG, and having more than one distance between grating elements. In the serial LPG case the distance will be constant for the first grating but will change for the next grating. In the superimposed grating case, the distance between elements will change more or less continuously.

The spacing separating the LPGs in FIGS. 4 and 5, and the placement of the LPG along the optical fiber are relevant parameters in the operation of the device. These can be tuned in the manner described above. A tuning device is shown schematically at 42. In this case the tuning device is shown as a heating element to vary the refractive index of the optical fiber. Other tuning devices may be used.

The construction and design of LPGs is known in the art. Mode converters made using LPGs are described in more detail in U.S. Pat. No. 6,768,835, issued Jul. 27, 2004, which is incorporated herein by reference. The gratings may be formed by locally changing the refractive index in the core of the optical fiber to form a pattern of serial regions with altered refractive index. There are a variety of methods for producing these changes. A common method is to dope the core of the optical fiber with a photosensitive agent, such as germanium, and "write" the refractive index pattern using UV light directed on the optical fiber through a spatial filter. See for example, U.S. Pat. No. 5,773,486, issued Jun. 30, 1998.

Figure 6:
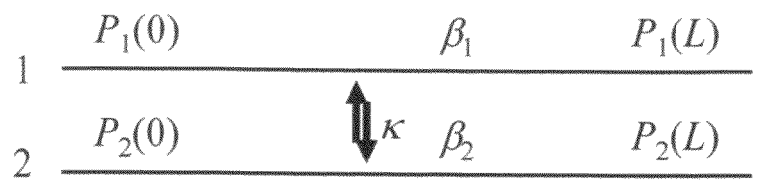
FIG. 6 shows a mode transformer diagram and a schematic form of a mode transformer based on index perturbations created by deforming an optical fiber.
Figure 6:
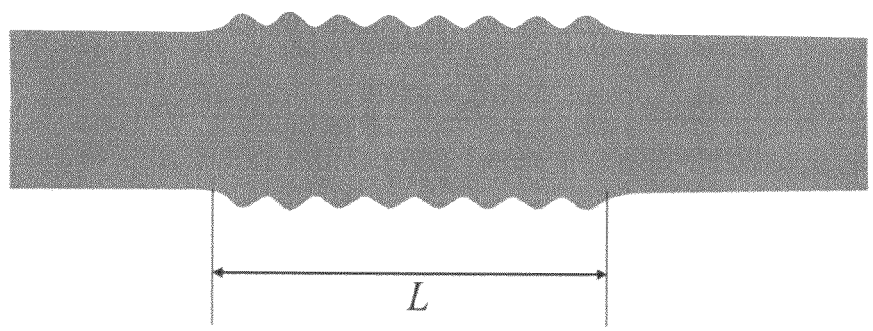
Figure 7:
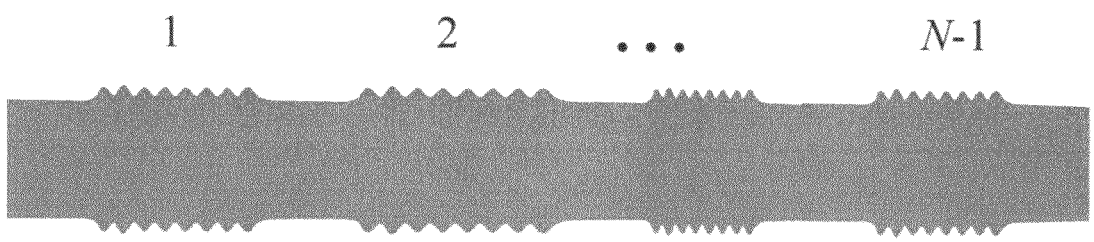
FIG. 7 is a schematic representation of multiple mode transformers based on index perturbations created by deforming an optical fiber.
Figure 8:
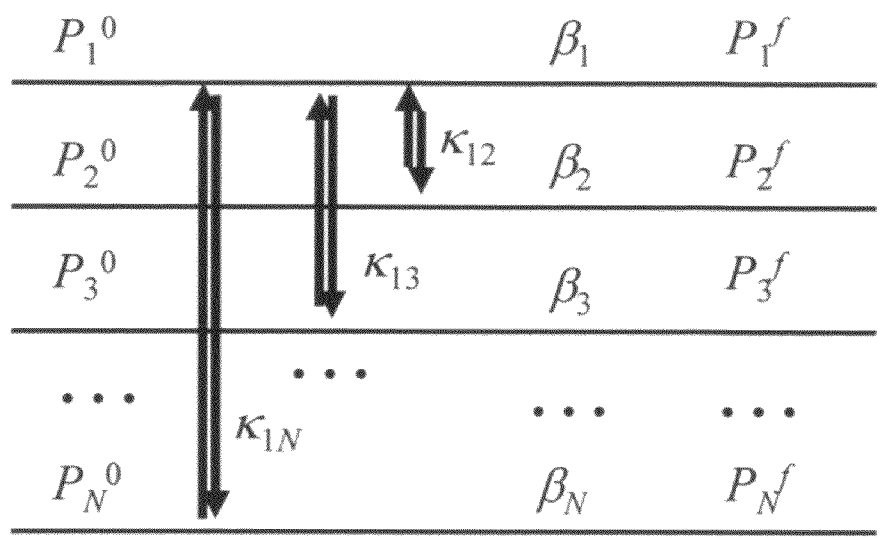
FIG. 8 shows a mode transformer diagram and a schematic form of a mode transformer which is a modified version of the multiple mode transformers of FIG. 7.
Figure 8:
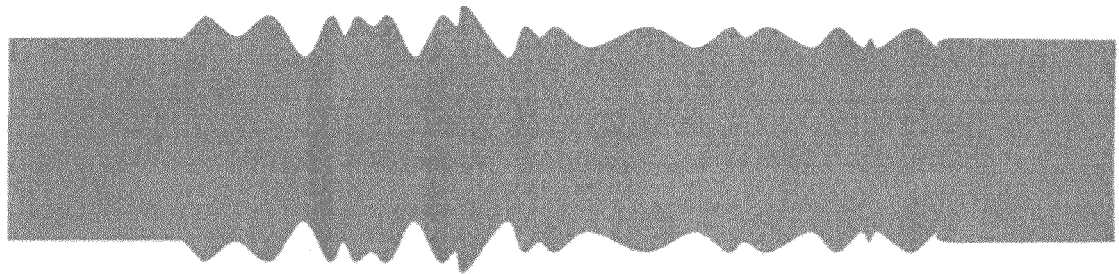

Another effective method is described in U.S. patent application Ser. No. 11/903,759, filed Sep. 25, 2007, and incorporated by reference herein. This form of LPG is produced by physically deforming the optical fiber. Embodiments of this type of LPG are represented by FIGS. 6-8. FIG. 6 shows a single LPG with coupling between two modes as indicated in the associated diagram. The diagram describes energy exchange for modes 1 and 2 as were considered with equation 2 earlier. FIG. 7 shows an embodiment of a complex LPG with multiple gratings 1, 2 to N−1 formed along the length of the optical fiber.

As in the case of FIG. 5, the individual serially located gratings may be merged into a single complex grating as shown in FIG. 8.

In the embodiments described above, the HOM section will usually contain multiple modes and the output will typically be a single mode. It should be evident from the description above that any number of input modes can be processed according to the invention, with one or more output modes. The effect of the mode transformers may be to convert the modes to another mode, or to increase or decrease the power ratio between the modes.

While the mode transformation illustrated in FIGS. 1-3 is essentially a transformation of multiple modes to a single mode, there may be applications where the desired output also has multiple modes. The design information that follows is general to all cases of interest. Since the mode converter devices are reciprocal devices, design of a 1 to n mode converter is the same as an n to 1 converter, or an m to n or n to m converter.

The mode transformations using LPGs will now be described in detail. In this description, the LPG example used is the embodiment of FIG. 5, i.e., superimposed LPGs (SLPGs). It should be understood, as described earlier, that alternatives to SLPGs may be used.

Consider a coherent beam emerging from the SLPG converter positioned at the end of a single mode optical fiber, and in particular, an SLPG consisting of five axially symmetric LPGs that couple six $LP_{0j}$ modes. The output beam generated by a linear combination of these modes is determined using the Fresnel diffraction integral in the form of the Hankel transform:

$$E_{out}(\rho, z) = \frac{2\pi i}{\lambda(z-L)} \exp\left[\frac{2\pi i}{\lambda}(z-L)\right] \quad (27)$$

$$\int_0^R E_{out}(\rho_1, L) \exp\left[\frac{\pi i(\rho_1^2 + \rho^2)}{\lambda(z-L)}\right] J_0\left[\frac{2\pi \rho_1 \rho}{\lambda(z-L)}\right] \rho_1 d\rho_1,$$

$$\rho = \sqrt{x^2 + y^2}.$$

Here R is the fiber radius, $E_o(\rho,L)$ is the field distribution at the end-wall of the fiber, z=L, which in this case is a linear combination of six normalized transverse $LP_{0j}$ modes, $e_{oj}^{LP}(\rho)$:

$$E_{out}(\rho, L) = \sum_{j=1}^{6} A_j e_{0j}^{LP}(\rho) \quad (28)$$

Modes $e_{oj}^{LP}(\rho)$ are uniquely determined by the refractive index profile of a fiber. In our modeling, we considered an SMF-28 fiber (R=62.5 μm, $\rho_{core}$=4.1 μm, refractive index difference 0.36%), for which these modes were calculated numerically. The coefficients $A_j$ in Eq. (27) may be optimized to focus the beam in the near field region or to approach a homogeneous beam profile in the far field region.

For the near field case, in order to increase the peak intensity and to suppress the sidelobes, the beam profile determined by Eq. (27) and (28) can be optimized by variation of the complex-valued coefficients $A_j$. In our modeling, the objective function is chosen in the form:

$$F(A_2, A_3, \ldots A_6) = \int_{\rho_m}^{\infty} |E_{out}(\rho, z_0)| d\rho \quad (29)$$

where we set $A_1$=1 in the Eq. (28) for $E_{out}(\rho,z)$. Minimization of $F(A_2, A_3, \ldots A_6)$ was performed at fixed $z_0$−L=0.5 mm and $z_0$−L=1 mm by variation of 5 complex parameters $A_2, A_3, \ldots A_6$. The parameter $\rho_m$ defines the region outside the central peak of the emerging beam where the sidelobes are suppressed. In our modeling, we chose $\rho_m$=15 μm. The obtained optimum values of $A_j$ are given in Table 1.

TABLE 1

|  | Focused at 0.5 mm | Focused at 1 mm | Far field uniform |
| --- | --- | --- | --- |
| $A_1$ | 1 | 1 | 1 |
| $A_2$ | 0.60253exp(1.53614i) | 1.16235exp(1.61978i) | −0.05548 |
| $A_3$ | 1.07471exp(1.89742i) | 1.80893exp(2.33612i) | −0.14934 |
| $A_4$ | 1.2775exp(2.47505i) | 1.55662exp(−2.82123i) | −0.41936 |
| $A_5$ | 1.11976exp(−2.99339i) | 0.64839exp(−1.16064i) | −0.93562 |
| $A_6$ | 0.59115exp(−2.07753i) | 0.39395exp(2.13461i) | −0.69917 |

Figure 10:
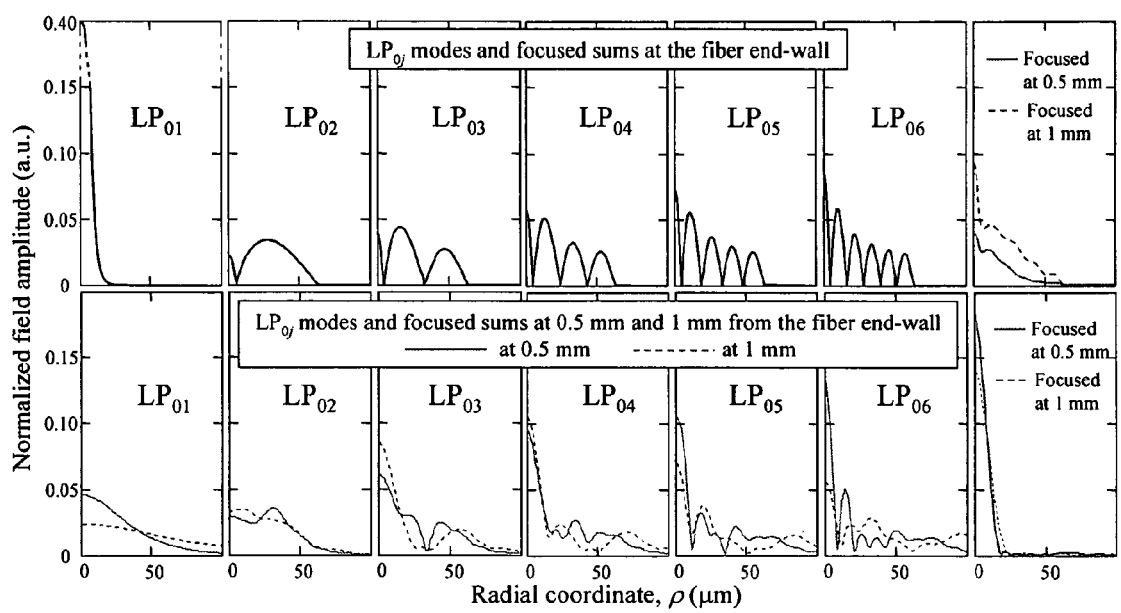
FIG. 10 shows near field distribution profiles of multiple output modes produced from a single input mode and is incorporated by reference from U.S. application Ser. No. 12/157,214.

The corresponding filed amplitude profiles at $z_0$−L=0.5 mm and $z_0$−L=1 mm (near field) are shown in FIG. 10 as solid and dashed curves, respectively. The lower row of plots demonstrates significant improvement of the optimized profiles as compared to the profiles of beams generated by individual $LP_{0j}$ modes. Note that, for better visibility, FIG. 10 shows the filed amplitude rather than the field intensity distribution. The relative improvement of the optimized field intensity is more apparent.

Table 2 tabulates the fraction of the total beam power inside the 15 mm radius circle at 0.5 mm from the fiber end, and inside the 25 mm radius circle at 1 mm from the fiber end, showing the values for the individual mode beams and the optimized beam.

TABLE 2

|  | $LP_{01}$ | $LP_{02}$ | $LP_{03}$ | $LP_{04}$ | $LP_{05}$ | $LP_{06}$ | Foc. at 0.5 mm | Foc. at 1 mm |
|---|---|---|---|---|---|---|---|---|
| Power inside the 15 μm radius circle at 0.5 mm (%) | 21.9 | 8.2 | 22.5 | 30.2 | 28.6 | 32.0 | 99.0 | |
| Power inside the 25 μm radius circle at 1 mm (%) | 16.1 | 32.4 | 47.2 | 42.2 | 36.4 | 13.5 | | 98.3 |

For any of the $LP_{0j}$ modes in Row 2 of Table 2 the power fraction does not exceed 32%. However, it approaches 99% for the optimized beam. Similarly, the power fraction for the $LP_{0j}$ modes in Row 3 this fraction varies between 16% and 43%, but is equal to 98.3% for the optimized beam. Comparison given by FIG. 5 and Table 2 clearly indicates that the suggested SLPG mode converter can serve as an efficient beam focuser.

For the far field case, which is defined by the inequality $z-L \gg R^2/\lambda$, the integral in Eq. (27) is simplified to $$E_{far}(\theta, r) = \frac{2\pi i}{\lambda r} \exp\left\{\frac{2\pi i}{\lambda} r\right\} f(\theta), \quad (30)$$

$$r = \sqrt{(z-L)^2 + \rho^2},$$

$$f(\theta) = \int_0^R E_{out}(\rho_1, L) J_0\left[\frac{2\pi \theta \rho_1}{\lambda}\right] \rho_1 d\rho_1,$$

$$\theta = \frac{\rho}{z-L} \ll 1.$$

Here the scattering amplitude $f(\theta)$ and the scattering angle $\theta$ are introduced. In numerous applications (e.g. materials processing, laser printing, micromachining in the electronics industry, optical processing) it is desirable to uniformly illuminate a specific volume of space with a laser beam. Following the basic teachings described earlier, the SLPG converter can be used as simple, robust, and efficient all-fiber beam homogenizer. The sum of $LP_{0j}$ modes generated by SLPG, Eq. (28) forms a beam that has a very uniform central region. To address homogenizing of the beam in the far-field region, the objective function may be chosen in the form $$F(A_1, A_2, A_3, \ldots A_6) = \int_0^{\theta_m} |E_{far}(\theta, r_0) - E_0| d\theta \quad (31)$$

Figure 9:
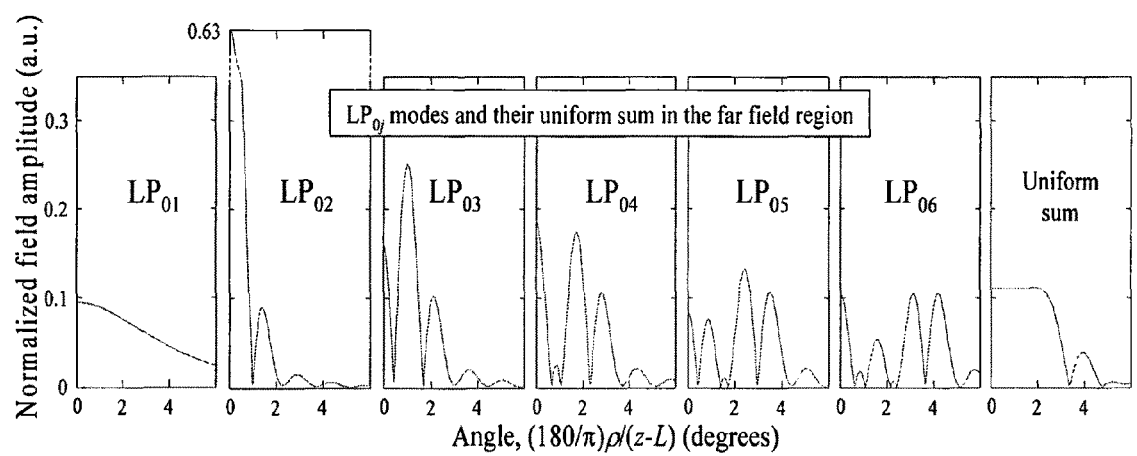
FIG. 9 shows far field distribution profiles of multiple output modes produced from a single input mode.

The function $F(A_1, A_2, A_3, \ldots A_6)$ was minimized by numerical variation of six real variables $A_1, A_2, A_3, \ldots A_6$, choosing the homogenized beam radius, $\theta_m$, and the field amplitude, $E_0$ manually. FIG. 9 compares the far-field amplitude distributions for the first six $LP_{0j}$ modes and their optimized sum. The homogenized beam profile, which is shown in FIG. 9, was obtained for parameters $A_j$ given in column 4 of Table 1. The central peak of the optimized sum has the diameter of 6.8° and 91% of the total beam power. A homogeneous part of this peak, where the relative amplitude nonuniformity does not exceed ±0.2%, has the diameter 4° and 52% of the total beam power. Thus, the considered example demonstrates that SLPG consisting of a reasonable number of gratings can produce extremely homogeneous light beams.

Coefficients $A_j$ in Eq. (28) determine the superposition of output fiber modes to form a beam of the desired shape. The specific design of SLPGs using the example of the homogenized beam considered above may be implemented by determining the SLPG refractive index variation given by:

$$\delta n(x, y, z) = \left[\delta n_0 + \sum_{k=2}^{6} \delta n_{1k} \cos(2\pi z / \Lambda_{1k} + \phi_{1k})\right] \theta\left(\rho_{core} - \sqrt{x^2 + y^2}\right) \quad (32)$$

with parameters $\Lambda_{1k}$, $\phi_{1k}$, $\delta n_{1k}$, and $\delta n_0$. Coefficients $A_j$ for this example are given in column 4 of Table 1. Other parameters that determine the SLPG are summarized in Table 3.

TABLE 3

| j | 1 | 2 | 3 | 4 | 5 | 6 |
|---|---|---|---|---|---|---|
| $\beta_j \mu m^{-1}$ | 5.87187 | 5.86328 | 5.86254 | 5.8613 | 5.85958 | 5.85739 |
| $I_{1j}$ | — | 0.03226 | 0.05863 | 0.07999 | 0.09643 | 0.10849 |
| $I_{jj}$ | 0.74511 | 0.00145 | 0.00481 | 0.00907 | 0.01347 | 0.01762 |
| $10^5 \kappa_{1j} \mu m^{-1}$ | — | 0.07952 | 0.21401 | 0.60098 | 1.34084 | 1.00199 |
| $10^5 \delta n_{1j}$ | — | 1.21617 | 1.80099 | 3.70689 | 6.8604 | 4.55656 |
| $10^5 \kappa_{jj} \mu m^{-1}$ | 27.3969 | 0.05319 | 0.17686 | 0.3334 | 0.4954 | 0.64779 |
| $\Lambda_{1j}$ | — | 731.132 | 673.327 | 594.553 | 511.214 | 433.809 |
| $\phi_{1j}$ | — | 0.465312 | 0.527147 | 0.605417 | 0.686417 | 0.762612 |

The values in the Table 3 are calculated as follows. First, the propagation constants of the $LP_{0j}$ modes of an SMF-28 at wavelength $\lambda=1.55$ μm are given in row 2. The overlap integrals $I_{1j}$ and $I_{jj}$ for these modes are calculated based on the wave equations using the following.

Assume the SLPG is introduced in the core of the optical fiber by a perturbation of the refractive index, $$\delta n(x, y, z) = \left[\delta n_0 + \sum_{j>k=1}^{N} \delta n_{jk} \cos(2\pi z/\Lambda_{jk} + \phi_{jk})\right] \quad (33)$$

$$\theta\left(\rho_{core} - \sqrt{x^2 + y^2}\right),$$

where x and y are the transverse coordinates, z is the longitudinal coordinate, $\theta(s)$ is a Heaviside step function, $\rho_{core}$ is the core radius, and $\Lambda_{jk}$ are the periods of harmonics. In the coupled wave theory of a weakly guiding fiber, the field can be written in the scalar form $E(x,y,z) = \Sigma_j A_j(z) \exp(i\beta_j z) e_j(x,y)$, where $e_j(x,y)$ are the transverse components of eigenmodes and $\beta_j$ are the propagation constants. It is assumed that the periods $\Lambda_{jk}$ approximately match the differences between the propagation constants of the fiber modes, i.e., $2\pi/\Lambda_{jk} \approx \beta_j - \beta_k$, so that the harmonic (j,k) couples together modes j and k. The coupled mode equation for $A_j(z)$ can be derived from a general coupled mode theory in the form:

$$\frac{dA_j}{dz} = i\sum_{k=1}^{N} \kappa_{jk} \exp\left[i\left(\beta_j - \beta_k + \frac{2\pi}{\Lambda_{jk}}\right)z + i\phi_{jk}\right]A_j, \quad (34)$$

where $\kappa_{jk}$ are the coupling coefficients defined by the following equations:

$$\kappa_{jj} = \frac{\pi \delta n_0}{\lambda} I_{jj}, \quad (35)$$

$$\kappa_{jk} = \frac{\pi \delta n_{jk}}{\lambda} I_{jk}, \quad j \neq k,$$

$$I_{jk} = \int_{\sqrt{x^2+y^2}<\rho_{core}} dxdy\, e_j(x,y)e_k(x,y).$$

Here, $\lambda$ is the wavelength of light in free space and the transverse eigenmodes $e_j(x,y)$ are normalized, $$\int_{-\infty}^{\infty}\int_{-\infty}^{\infty} dxdy\, e_j^2(x,y) = 1.$$

In Eq. (34), it is assumed that the periods $\Lambda_{jk}$ are positive for j>k and the propagation constants are monotonically decreasing with their number, i.e. $\beta_j < \beta_k$ for j>k. In addition, $\phi_{jj}=0$, $1/\Lambda_{jj}=0$, $\Lambda_{jk}=-\Lambda_{kj}$, $\phi_{jk}=-\phi_{kj}$, and, as follows from Eq. (35), $\kappa_{jk}=\kappa_{kj}$.

The values of these integrals are given in rows 3 and 4.

Next, the following equation gives values for the phase shifts, $\phi_{ij}$, the relative values of coupling coefficients, $\kappa_{1j}/\kappa_{12}$, and the corresponding SLPG length L.

$$\phi_{1j} = \gamma_1 - \gamma_j - \kappa_{11}L + \kappa_{jj}L \pm \frac{\pi}{2}, \quad (36)$$

$$\kappa_{1j} = \kappa_{12}\frac{|A_j(L)|}{|A_2(L)|},$$

$$\tan(\mu L) = \pm \frac{|A_2(L)|\mu}{|A_1(L)|\kappa_{12}}.$$

From this equation, the coupling coefficients $\kappa_{1j}$ should be proportional to $A_j$, i.e. $\kappa_{1j}=CA_j$, with a constant C to be determined. In theory, Eqs. (36) allow the length of SLPG, L, to be chosen independently of other parameters. However, smaller L requires stronger gratings and includes less LPG periods. Assuming a reasonable value of L=50 mm. Then with $A_j$ from Table 1, column 4, we find $C=1.4331\times 10^{-5}\,\mu m^{-1}$ and the values of coupling coefficients $\kappa_{1j}=CA_j$ (j>1) given in row 5 of Table 3. With the known $\kappa_{1j}$ and $I_{1j}$, from Eq. (35), we find $\delta n_{1j}=\lambda \kappa_{1j}/(\pi I_{1j})$ at $\lambda=1.55\,\mu m$, which is given in row 6. Index $\delta n_0$ may be determined from the condition that the overall introduced index variation should be positive: $\delta n_0 = \Sigma_{j>1}|\delta n_{1j}|=1.8141\times 10^{-4}$. This value of $\delta n_0$ together with $I_{jj}$ from row 4 determines the self-coupling coefficients given in row 7.

The periods of gratings, $\Lambda_{1k}$, in row 8 may be determined from the following:

$$2\pi/\Lambda_{jk} = \beta_j - \beta_k - \kappa_{kk} + \kappa_{jj}, \quad (36)$$

where the self-coupling coefficients, $\kappa_{jj}$, and propagation constants, $\beta_j$, are given in row 6 and 1, respectively. Finally, the LPG phase shifts given in row 9 may be calculated from:

$$\phi_{1j} = (\kappa_{jj} - \kappa_{11})L + \pi/2 \quad (37)$$

It should be evident to those skilled in the art that a first E-field comprised of a set of modes propagating in an HOM fiber can be matched to a second, different E-field in second, different medium at the output of the fiber. By the principle of reciprocity, the light propagation is the same out of, or into, the HOM fiber. Thus, if, for example, a Gaussian beam in the second medium impinging onto an HOM fiber breaks up into a set of modes of the fiber then a set of LPGs or index perturbations which generates precisely this set of mode amplitudes and phases in the HOM fiber will cause the light propagating in the other direction to recombine at the output to produce a second E-field in the form of the same Gaussian beam in the second medium after the fiber output. Moreover, if one can do approximately this linear combination of modes, then one can generate at the HOM fiber output a second E-field pattern in the medium after the output that is largely the same as the desired E-field.

This proves that the HOM can go to N modes after the LPG and that these N modes can give a Gaussian, LMA, or ACPGB mode.

The specific waveguides in the embodiments shown in the figures are optical fiber waveguides. However, the equations given above are general waveguide equations and apply to other forms of waveguides as well. For example, the invention may be implemented with planar optical waveguides in optical integrated circuits. These options may be described using the generic expression optical or electromagnetic field waveguide.

In devices made according to the invention the transmission medium, for example, an LMA optical fiber or free space, coupled to the complex LPG mode transformer will be adapted to support a light beam with an E-field substantially different (typically larger) than the E-field of the HOM in the HOM optical fiber. Substantially different in this context means different by at least 25% in area.

Likewise when the properties of the HOM optical fiber and the large mode area optical fiber are expressed in terms of the relative size of the optical fiber cores, substantially larger in that context means larger by at least 25% in area.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method comprising:
   a) transmitting a light beam with at least one higher order mode (HOM) in a core of a first optical waveguide, where the light beam in the first optical waveguide has a first E-field,
   b) using a complex long period grating (LPG) mode transformer to transform at least a portion of the light beam into one or more modes in the first optical waveguide to produce an output light beam, and
   c) coupling the output light beam to a large mode area (LMA) waveguide with a second E-field, the LMA waveguide having a core that is substantially larger than the core of the first optical waveguide, wherein a superposition of the one or more modes of the output light beam essentially matches a fundamental mode of the LMA waveguide.

2. The method of claim 1 wherein the first optical waveguide is an optical fiber and the LMA waveguide is an LMA fiber.

3. The method of claim 1 wherein the complex LPG mode transformer comprises at least 3 LPGs.

4. An optical device comprising:
a) a first optical waveguide having a core and a cladding, with the core adapted to support a light beam with at least one higher order mode (HOM), the HOM having a first E-field,
b) a complex long period grating (LPG) mode transformer coupled to the first optical waveguide and adapted to transform at least a portion of the HOM to one or more modes in the first optical waveguide to produce an output light beam, and
c) a large mode area (LMA) waveguide coupled to the complex LPG mode transformer, the LMA waveguide having a core that is substantially larger than the core of the first optical waveguide, the LMA waveguide adapted to support a light beam with a second E-field, wherein the superposition of the one or more modes of the output light beam essentially matches the fundamental mode of the LMA waveguide.

5. The optical device of claim 4 wherein the first optical waveguide comprises an optical fiber and the LMA waveguide comprises an LMA fiber.

6. The optical device of claim 4 wherein the complex LPG mode transformer comprises at least 3 LPGs.

7. The optical device of claim 6 wherein the complex LPG mode transformer comprises photoinduced LPGs.

8. The optical device of claim 6 wherein the complex LPG mode transformer comprises LPGs comprising physical deformations of an optical fiber.

9. The optical device of claim 7 wherein the complex LPG mode transformer comprises superimposed LPGs.

* * * * *